United States Patent [19]

King

[11] Patent Number: 6,109,064
[45] Date of Patent: Aug. 29, 2000

[54] PROCESS FOR TREATING OPTICAL FIBERS BY CRYOGENIC TEMPERING

[75] Inventor: George A. King, Pompano Beach, Fla.

[73] Assignee: Siemens Information and Communication Networks, Inc., Boca Raton, Fla.

[21] Appl. No.: 09/052,785

[22] Filed: Mar. 31, 1998

[51] Int. Cl.[7] .......................... C03B 32/02; C03B 37/10
[52] U.S. Cl. ...................... 65/378; 65/384; 65/434; 65/485; 65/488; 65/510; 65/33.1; 264/1.24; 264/2.6
[58] Field of Search .................. 65/378, 384, 434, 65/485, 488, 510, 33.1; 264/1.24, 2.6; 148/577, 578

[56] References Cited

U.S. PATENT DOCUMENTS

| | | | |
|---|---|---|---|
| 4,236,904 | 12/1980 | Lazay | 65/378 |
| 4,678,274 | 7/1987 | Fuller | 385/144 |
| 4,902,327 | 2/1990 | Levinson | 65/485 |
| 5,044,422 | 9/1991 | Lenker | 165/2 |
| 5,152,851 | 10/1992 | Yamamoto et al. | 148/333 |
| 5,196,399 | 3/1993 | Shiota et al. | 65/443 |
| 5,263,886 | 11/1993 | Workman | 445/7 |
| 5,314,515 | 5/1994 | Cain | 65/434 |
| 5,447,032 | 9/1995 | Epstein et al. | 62/3.1 |
| 5,447,035 | 9/1995 | Workman et al. | 62/62 |
| 5,865,913 | 2/1999 | Paulin et al. | 148/577 |

OTHER PUBLICATIONS

Kingery, et al, Introduction to Ceramics, 2nd ed. John Wiley and Sons, New York, pp. 92–95, 612–635, 695–696, 1972.
Kollmer, Kristoffer P., "Applications & Developments in the Cryogenic Processing of Materials", Technology Interface, Winter 1999.
Tokunaga, et al, Japanese Patent Abstracts, JP 1–10205A, Jan. 1989.

*Primary Examiner*—Sean Vincent
*Attorney, Agent, or Firm*—Joseph S. Codispoti

[57] ABSTRACT

The transmission properties of an optical fiber are enhanced by cooling the fiber gradually to temperatures of at least −300° Fahrenheit, maintaining the fiber at such reduced temperature for a time suitable to stabilize the transmission properties of the fiber, and then allowing the fiber gradually to return to normal room temperature. The heating of the fiber to restore it to room temperature in part is accomplished by transmitting through the fiber optical pulses of the frequency and repetition rate the fiber will experience in normal use.

7 Claims, No Drawings

PROCESS FOR TREATING OPTICAL FIBERS BY CRYOGENIC TEMPERING

FIELD OF THE INVENTION

This invention relates to a process for treating optical fibers for use as wave guides in optical transmission systems and to fibers so treated.

BACKGROUND OF THE INVENTION

It has long been known that heat treatments can be used to improve the properties of materials. More recently it has been found that cold treating of many materials can similarly be used to improve the materials. of particular interest has been treatments that involve cooling a workpiece to cryogenic temperatures, for example temperatures of about −300 degrees Fahrenheit that can be readily achieved by the use of liquid nitrogen as the coolant.

Generally these treatments involve both gradual cooling at a controlled rate followed by gradual heating at a controlled rate to room temperature or higher. The improvement in the materials treated is generally explained to result from the rearrangement, such as denser packing, of molecules in the material and the improved properties have primarily involved the mechanical strength or electrical conductivity of the materials.

SUMMARY OF THE INVENTION

From one aspect present invention is directed to a process for treating optical fibers designed for use as the wave guides in optical transmission systems. Such fibers are generally of silica and are designed to transmit optical signals in the form of pulses of light for long distances with low attenuation and low phase dispersion. Since these fibers typically are of small diameter, for example fractions of a mils, it is also important that the silica fibers have considerable strength, particularly, in the direction of the fiber axis to permit convenient handling of the fiber.

More particularly, in its process aspect, the present invention is directed a process for treating an optical fiber that involves cooling the fiber at a controlled slow rate to temperatures typically of −300° Fahrenheit or lower, keeping the fiber at such temperature until its optical transmission properties have stabilized, and then allowing the fiber to return to room temperature, also at a controlled slow rate. It is expected to be advantageous to transmit optical pulses of the wavelength and repetition rate to be used in practice during at least part of each of the cooling, stabilizing, and heating periods of the process to optimize the rearrangement of the molecules of the fiber during such periods. Advantageously, the cooling should occur at a rate of between about one or two degrees per minute and the subsequent heating at about the same rate. It is expected that the optimum cooling and heating rates will to some extent be dependent on the particulars of the fiber being treated. The length of time the fiber should be maintained at −300° Fahrenheit or lower will also be dependent on the particulars of the fiber. It is expected that such time will be at least one or two hours. It is also expected that both the optimum rate of cooling and the optimum rate of heating may vary over a complete cycle. As a feature of the preferred embodiment of the process aspect of the invention, the heating of the fiber is at least in part accomplished by transmitting axially along the fiber light pulses of both the optical frequency and repetition rate of the light to be transmitted when the fiber is in commercial use. Moreover, a related feature of the process aspect of the invention involves measuring continuously the transmission properties of the fiber as it is being treated and using the results of such measurements to control the rate of cooling and of heating to optimize the transmission properties. Generally the properties of an optical fiber of particular importance for its use as a wave guide are the attenuation loss and the phase dispersion experienced by the light pulses as they are transmitted along the fiber. The lower the attenuation and the less the phase dispersion the longer the light pulses may be transmitted reliably without the need for being repeated.

Generally the transmission properties of an optical fiber are better, the more uniform its dielectric constant and its refractive index.

From the process aspect, the present invention is directed to a a process for improving the transmission properties of an optical fiber. The process comprises the steps of gradually cooling the fiber to a temperature of 300° F. or lower; maintaining such fiber at such temperature for a period of time sufficient to stabilize the optical transmission properties; and then gradually heating the fiber back to room temperature.

In its product aspect, the invention is directed to a fiber whose properties have been improved by the novel processes involved.

The invention will be better understood from the following Detailed Description.

DETAILED DESCRIPTION

An illustrative embodiment of the process aspect of the invention involves taking a reel of coiled fiber shortly after it has been made and positioning it in a suitable chamber. Once the fiber is positioned in the chamber, the temperature in the chamber is gradually cooled by flowing liquid nitrogen to a heat exchanger that cools the air in the chamber. A cooling rate of one or two degrees Fahrenheit per minute should be suitable to reach a temperature of −300° Fahrenheit in a matter of several hours. The coiled fiber is maintained at such temperature for a time sufficient to have its optical transmission properties stabilize. This typically is for an hour or two to permit the silica molecules in the fiber adequately to compress as their vibrations are slowed because of the reduced temperature. Advantageously, the length of time that the fiber should be kept at such temperature before reheating can be determined by arranging to have light pulses, of the wavelength and repetition rate expected to be used in practice, transmitted through the fiber during the cooling, and maintaining such transmission for monitoring the attenuation and phase dispersion in the fiber during the stabilizing period. Once these properties appear to be stabilized, the fiber is gradually heated back to normal room temperature. The heating may be accomplished gradually by slowly discontinuing the supply of nitrogen to the heat exchanger. It may be furthered by continuing to transmit light pulses through the fiber, thereby allowing the energy of the light pulses to provide some heating. Moreover, by observing the effect of the heating rate on the transmission properties of the fiber and adjusting the rate to maintain the desired properties, there can be determined a suitable heating rate for the fiber. It is anticipated that typically the optimum heating rate like the optimum cooling rate would be between about one and two degrees per minute. The rate can be readily controlled by the flow of the nitrogen to the heat exchanger.

It is also expected that in some instances a continuous process may be preferable to the batch process described. In the continuous process, fibers are pulled through various zones maintained at different temperatures at a rate to achieve desired cooling and heating rates.

It should be understood that the specific embodiments described are merely illustrative of the general principles involved. Various changes can be made without departing from the spirit of and scope of the invention.

What is claimed is:

1. A process for cryogenically tempering a previously-formed optical fiber, comprising the steps of:

gradually cooling the fiber to a temperature of approximately −300° F. or lower;

maintaining such fiber at such temperature for a period of time; and then gradually heating the fiber back to room temperature.

2. The process of claim 1 in which optical pulses of the wavelength and repetition rate to be used in practice are transmitted through the fiber during at least part of each of the cooling, maintaining, and heating steps.

3. The process of claim 1 in which the gradual cooling is at a rate of about between one and two degrees Fahrenheit per minute over most of the cooling period.

4. The process of claim 1 in which the gradual heating is at a rate of about between one and two degrees Fahrenheit per minute over most of the heating period.

5. The process of claim 1 in which both the gradual cooling and heating are at a rate of about between one and two degrees Fahrenheit per minute over most of the said period.

6. The process of claim 4 in which the heating of the fiber is accomplished in part by transmitting through the fiber light pulses of optical frequency and repetition rate of the pulses for which the fiber is designed to transmit.

7. A process for cryogenically tempering a previously-formed optical fiber, comprising the steps of:

gradually cooling the fiber to a temperature of approximately −300° F. or lower at a rate of about between one and two degrees Fahrenheit per minute over most of the cooling period while applying optical pulses of the wavelength and repetition rate to be used in practice;

maintaining such fiber at such temperature for a period of time while continuing to apply optical pulses for transmission through the fiber; and gradually heating the fiber at a rate of about between one and two degrees Fahrenheit per minute over most of the heating period while continuing to apply optical pulses for transmission through the fiber during the gradual heating.

* * * * *